(12) United States Patent
Zoller (10) Patent No.: US 7,712,510 B2
(45) Date of Patent: May 11, 2010

(54) TIRE INSTALLATION TOOL

(75) Inventor: Patrick W. Zoller, Royal Oak, MI (US)

(73) Assignee: Android Industries LLC, Auburn Hills, MI (US)

( * ) Notice: Subject to any disclaimer, the term of this patent is extended or adjusted under 35 U.S.C. 154(b) by 21 days.

(21) Appl. No.: 11/855,411

(22) Filed: Sep. 14, 2007

(65) Prior Publication Data

US 2008/0066873 A1 Mar. 20, 2008

Related U.S. Application Data

(60) Provisional application No. 60/825,778, filed on Sep. 15, 2006.

(51) Int. Cl.
*B60C 25/138* (2006.01)
(52) U.S. Cl. .................................... 157/1.24; 157/1.17
(58) Field of Classification Search ............... 157/1.17, 157/1.2, 1.22, 1.24, 1.26, 1.28, 1.3
See application file for complete search history.

(56) References Cited

U.S. PATENT DOCUMENTS 5,472,034 A * 12/1995 Corghi ..................... 157/1.24
6,453,971 B2 * 9/2002 Vignoli ..................... 157/1.22

* cited by examiner

*Primary Examiner*—D. S Meislin
(74) *Attorney, Agent, or Firm*—Honigman Miller Schwartz and Cohn LLP (57) ABSTRACT

An installation tool for mounting a tire to a wheel, the tire and wheel defining a central axis, the tire having opposing annular sides and two circumferential beads that define an opening through the opposing annular sides and the wheel having shoulders for receiving the circumferential bead, the installation tool comprising a shoe having an upper axial side, a lower axial side and an outer radial side, wherein the shoe includes a beveled transition zone that extends across at least a part of at least one of the upper axial side and the outer radial side, the beveled transition zone defining a bead drawing surface that mounts the bead of the tire to the shoulder of the wheel when rotatable movement is introduced between the tire and the shoe.

11 Claims, 6 Drawing Sheets

TIRE INSTALLATION TOOL

CLAIM FOR PRIORITY

This disclosure claims the benefit of Provisional Patent Application No. 60/825,778 filed on Sep. 15, 2006.

BACKGROUND

1. Technical Field

This invention generally relates to tooling and to tooling for mounting tires to wheels.

2. Description of the Related Art

Typical tire/wheel assembly may incorporate one or more automated wheel/tire assembly lines to mount tires onto wheels. This process can involve, amongst other operations, mounting the tire onto the wheel, inflating the wheel to the proper pressure, and balancing the tire/wheel assembly. Some of these operations, if not all, can be done using automated means such as robots or the like. One common approach used for mounting a tire to a wheel is to lay the tire on top of the wheel and then to press against the sidewall of a tire (using a roller wheel or the like) thereby pushing the tire onto the rim. Typically, the roller wheel is circumferentially moved along the sidewall of the tire during the installation operation. Another common technique is to use a guide shoe that fits between the edge of the wheel and the tire bead. The shoe rides along the edge of the wheel as it is rotated about the center axis of the wheel. As the shoe rides along the wheel cage it engages the tire bead and transitions the tire bead onto the wheel. Although roller wheels and guide shoes are commonly used for mounting tires to wheels, they have drawbacks. In the case of roller wheels, the sidewall portion of the tire can be susceptible to scratching, cutting, and otherwise defacing. In the case of guide shoes, because the shoe "rides" along the wheel edge it can abrade the wheel (especially if the wheel is aluminum). The present invention eliminates this problem of potentially damaging the sidewall portion of the tire or defacing the wheel during the mounting operation by eliminating contact between the installation tool and the sidewall portion of the tire and the wheel.

SUMMARY

An installation tool for mounting a tire to a wheel, the tire and wheel defining a central axis, the tire having opposing annular sides and two circumferential beads that define an opening through the opposing annular sides and the wheel having shoulders for receiving the circumferential bead, the installation tool comprising a shoe having an upper axial side, a lower axial side and an outer radial side, wherein the shoe includes a beveled transition zone that extends across at least a part of at least one of the upper axial side and the outer radial side, the beveled transition zone defining a bead drawing surface that mounts the bead of the tire to the shoulder of the wheel when rotatable movement is introduced between the tire and said shoe.

DETAILED DESCRIPTION

The Figures illustrate an exemplary embodiment of a tire installation tool in accordance with the invention. It is to be generally understood that the nomenclature used herein is simply for convenience and the terms used to describe the invention should be given the broadest meaning by one of ordinary skill in the art.

Figure 1:
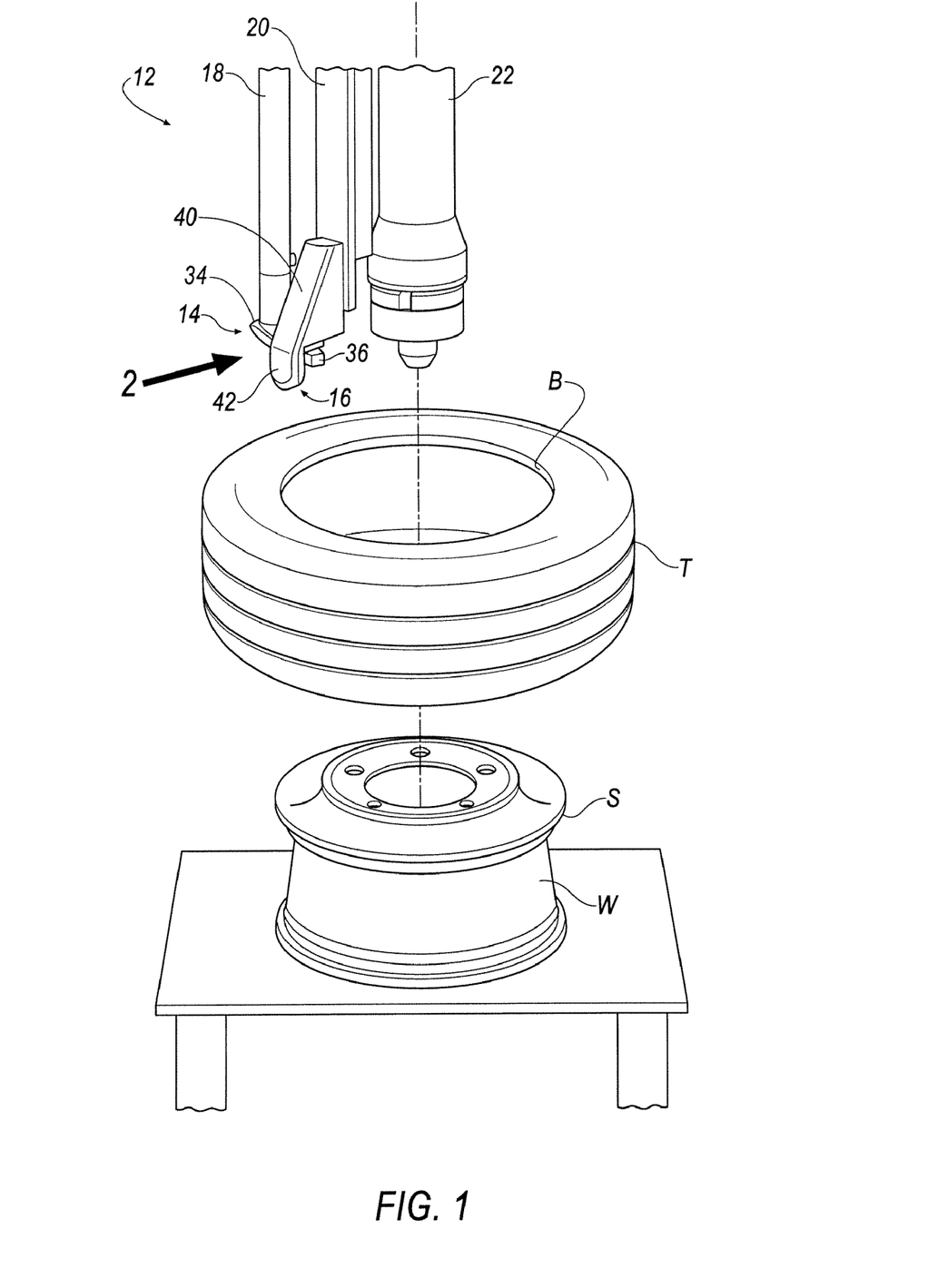
FIG. 1 is a perspective, exploded view of a tire installation tool for installing a tire to a wheel in accordance with an embodiment of the invention.
Figure 2:
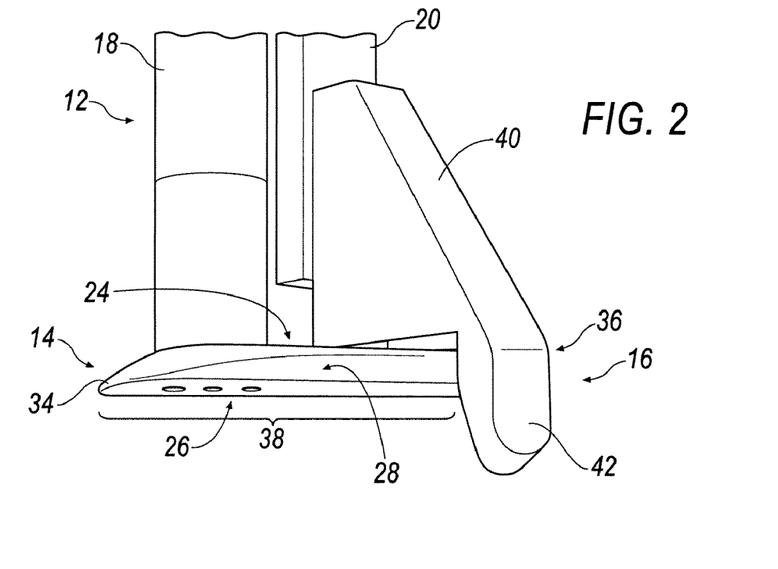
FIG. 2 is a perspective view of a tire installation tool of in accordance with an embodiment of the invention.
Figure 3:
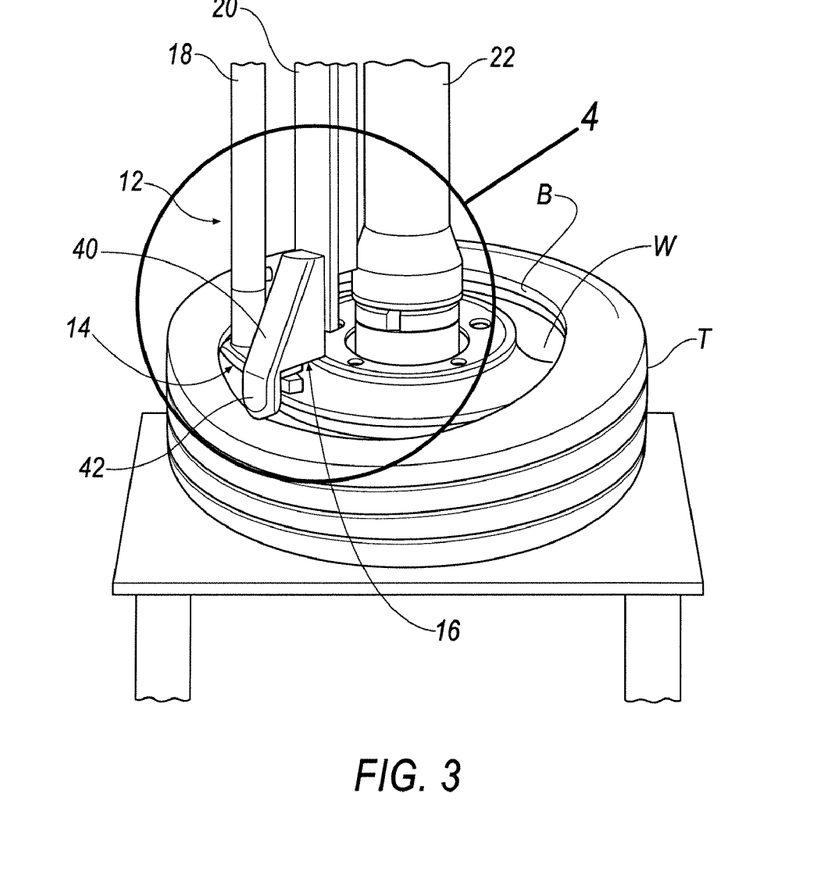
FIG. 3 is a perspective view of a tire installation tool, in a first intermediate stage, according to an embodiment of the invention.
Figure 4:
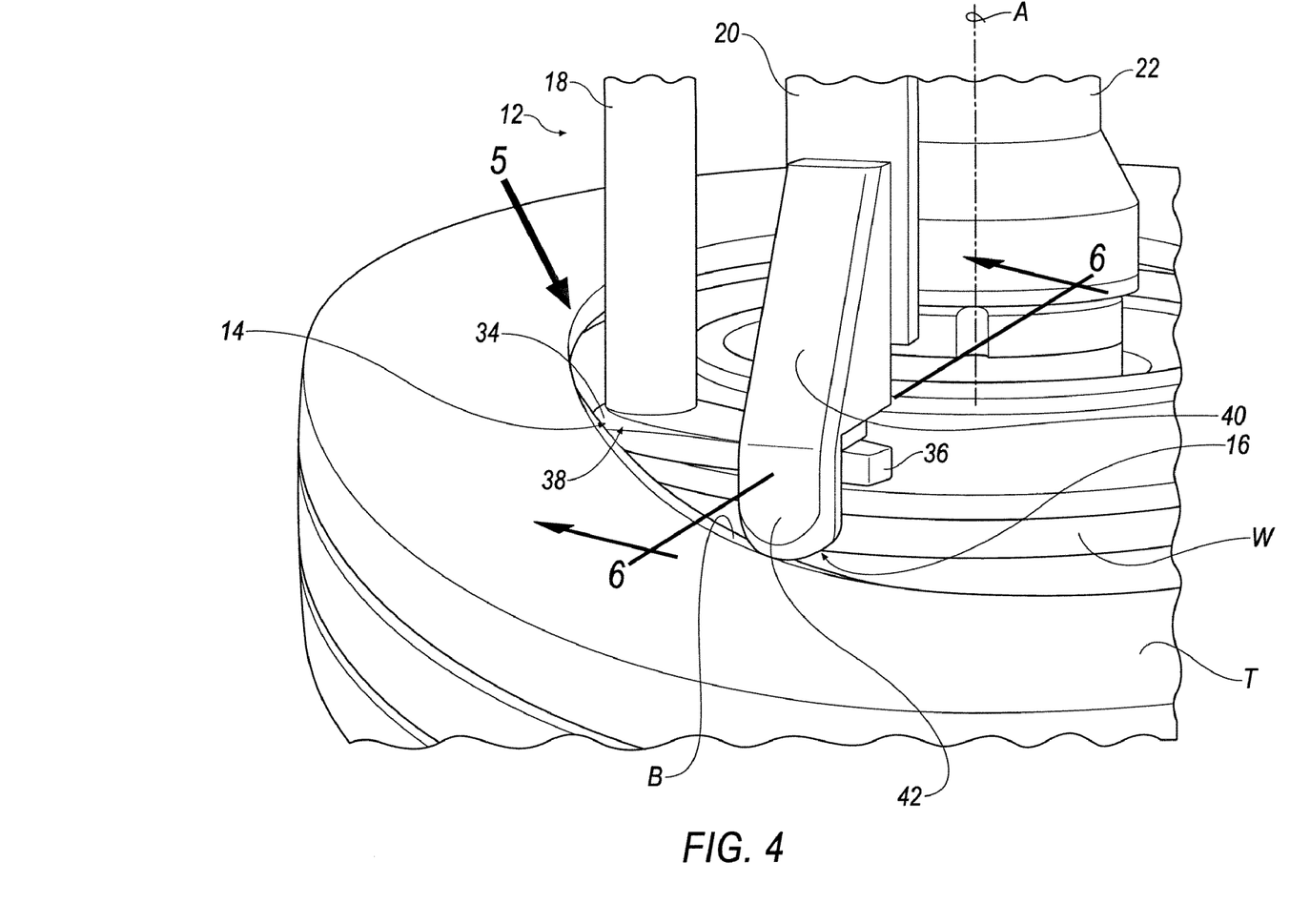
FIG. 4 is a detailed perspective view of the tire installation tool of FIG. 3.

Referring generally to all of the Figures, and FIGS. 1 and 2 in particular, an embodiment of a tire installation tool 12 is shown. In an embodiment, tire installation tool 12 includes a forward, staging implement 14 and a rearward, assistance implement 16. For ease of disclosure, forward implement 14 will be referenced throughout the remainder of this disclosure and in the claims as shoe 14 and rearward implement will likewise be referenced as trailing guide 16. It is to be understood that the choice of these terms, and similar terms, should not be used to limit the scope of which the claims are entitled.

Generally, shoe 14 and trailing guide 16 are provided to mount a tire T to a wheel W. After consulting this disclosure, however, one of ordinary skill will recognize that the trailing guide 16 may be omitted such that shoe 14 can carry out the mounting process without trailing guide 16. For example and among other factors, the inclusion or exclusion of trailing guide 16 is application specific and can depend on the flexibility of the tire, the speed of the rotation and the like.

In an embodiment and as depicted in the Figures, first and second supports 18, 20 are provided and connect to shoe 14 and trailing guide 16, respectively. While first and second supports 18, 20 are shown and described, based on the full teaching of this disclosure, it will be recognized that the invention may be practice without such supports, with additional supports or with a single support and the claims should not therefore be limited thereby.

In an embodiment, tire installation tool 12 is rotatably mounted to a controller (not shown) that rotates tire installation tool 12 around a hub 22. It will be appreciated that the invention may be realized without incorporating hub 22 or that hub 22 may rotate as well as tire installation tool 12. In an embodiment, one or both of first and second supports 18, 20 are operatively connected to the controller (not shown). In an embodiment, controller (not shown) rotatably moves shoe 14 and trailing guide 16 around axis A as depicted throughout the drawings, the action of which will be discussed throughout this disclosure. In an embodiment, tire installation tool 12 may alternatively be situated in a fixed position such that one or both of the tire T and wheel W are rotated around axis A to enable the mounting of tire T to wheel W. In yet another embodiment, both tire installation tool 12 and one or both of the tire T and wheel W may be rotated in opposite directions around axis A to enable the mounting of tire T to wheel W.

Figure 5:
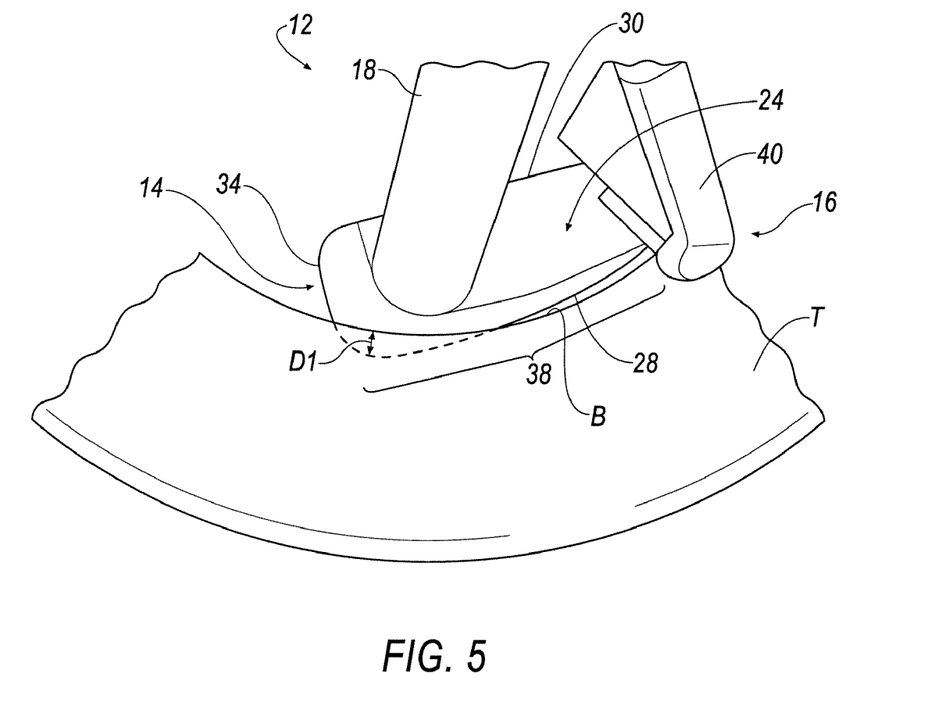
FIG. 5 is a top plan view of the installation tool acting on a tire and wheel assembly as taken from the perspective of line 5 of FIG. 4.

Referring now to FIG. 2 and in an embodiment, shoe 14 includes upper axial side 24, a lower axial side 26 and a perimeter defined at least in part by an outer radial side 28 and an inner radial side 30 (see FIG. 5)

With continued reference to FIG. 2, and in an embodiment, upper axial side 24 of shoe 14 includes a leading end 34 and a trailing end 36. In an embodiment, upper axial side 24 of shoe 14 includes a beveled transition zone 38 that extends around at least a portion of the leading end 34 and around at least a portion of the outer radial side 28 toward the trailing end 36. In an embodiment, transition zone 38 provides a surface that transitions the tire bead over the wheel shoulder (as shoe 14 rotates) and onto the wheel. For purposes of this disclosure, the term "beveled" can mean linearly or arcuately sloped. Likewise, the term "arcuately" can mean a covex arc or a concave arc. Moreover, it is also to be understood that the term "beveled" can mean any combination of the foregoing (e.g., linear, convex arc or concave arc) and the invention should not be limited to any particular transition zone construction. These and other features will be understood by one of skill after consulting this disclosure and the principles herein described.

With continued reference to FIG. 2, and in an embodiment, trailing guide 16 includes a base 40 having a lobe 42 that extends axially below the base 40 to a position axially beneath lower axial side 26 of shoe 14. In an embodiment, base 40 of trailing guide 16 may be supported upon upper axial side 24 of shoe 14. In an embodiment, trailing guide 16 is positioned proximate shoe 14 such that lobe 42 is arcuately offset (i.e. radially and axially offset) from shoe 14. Upon consulting this disclosure, however, it will be recognized that trailing guide 16 may not be supported by shoe 14 such that the arrangement thereof can take many formats. Accordingly, the scope of the invention should not be limited to the disclosed arrangement.

Figure 6:
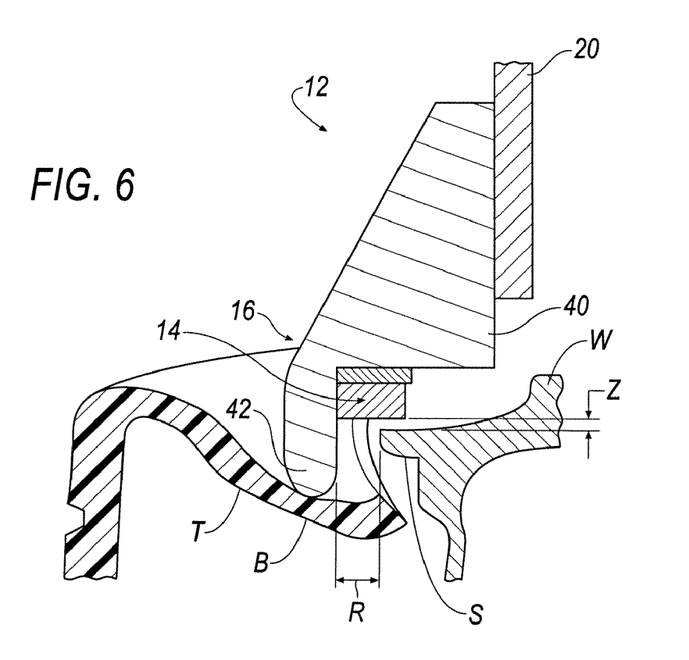
FIG. 6 is a cross-sectional view of the tire installation tool and tire and wheel assembly taken from the line 6-6 of FIG. 4.
Figure 7:
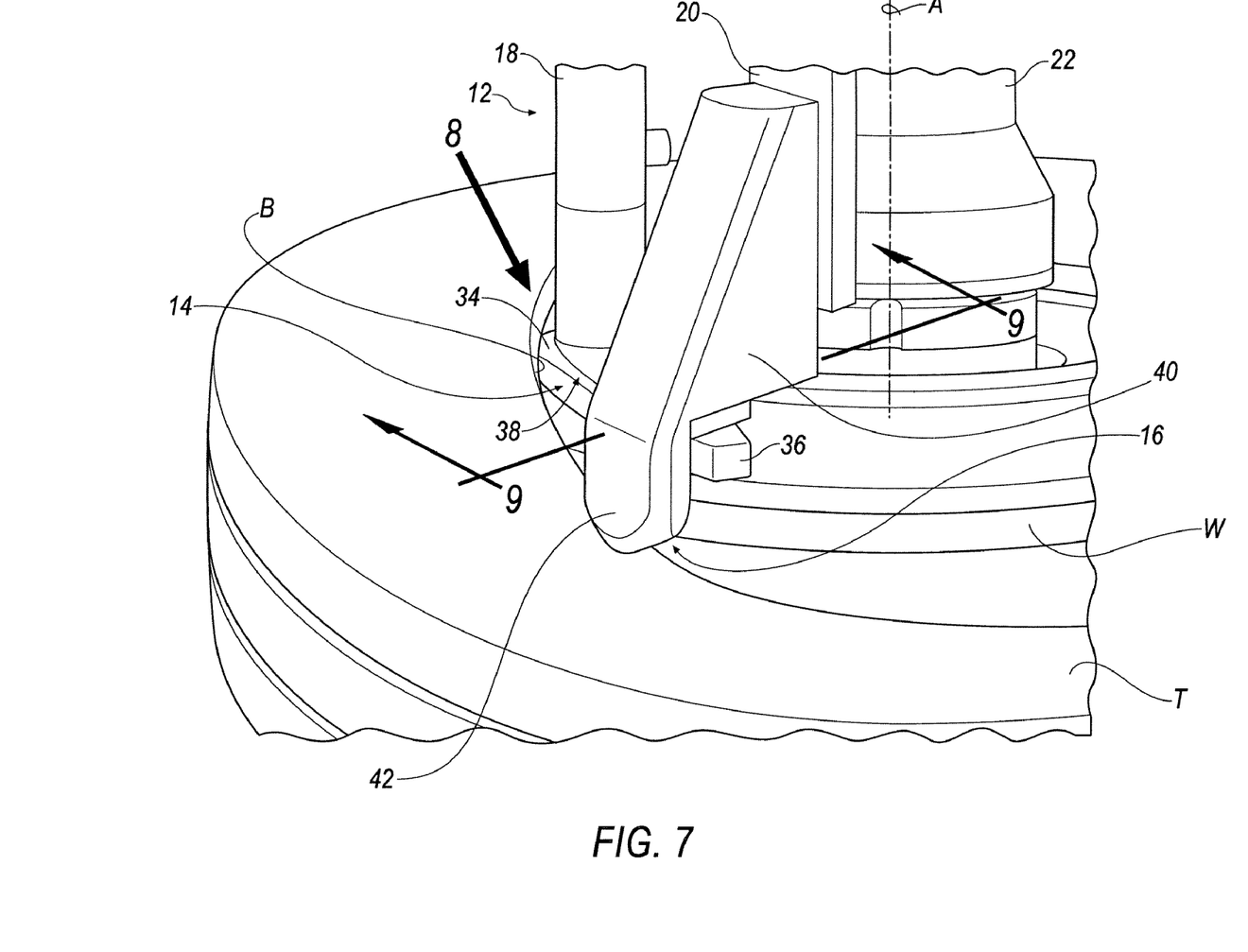
FIG. 7 is a perspective view of a tire installation tool, in a second intermediate stage, according to an embodiment of the invention.
Figure 8:
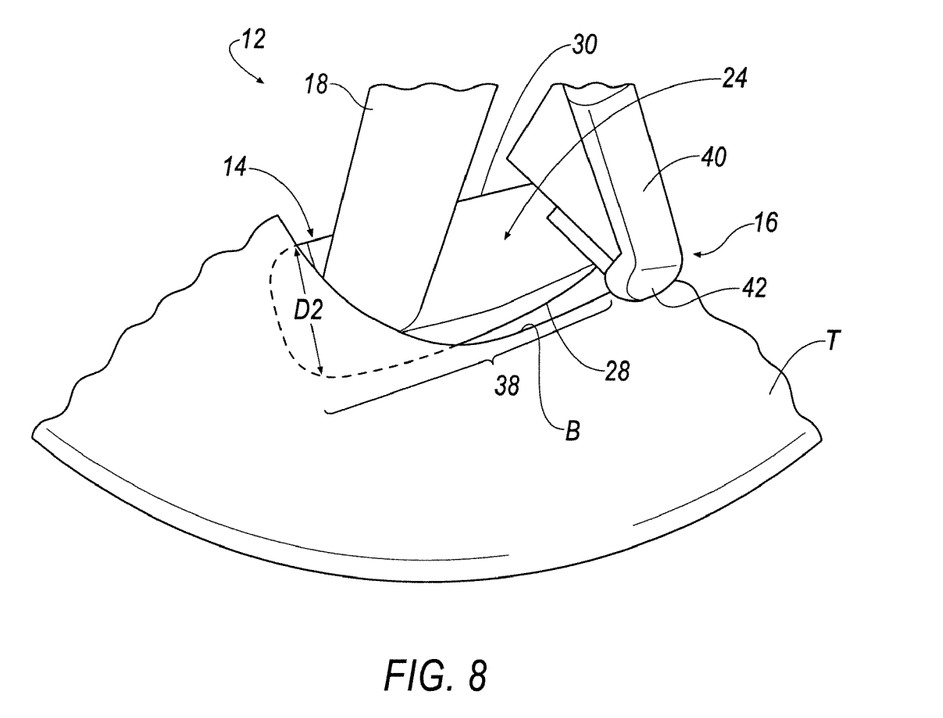
FIG. 8 is a top plan view of a installation tool acting on a tire and wheel assembly as taken from the perspective of line 8 of FIG. 7.
Figure 9:
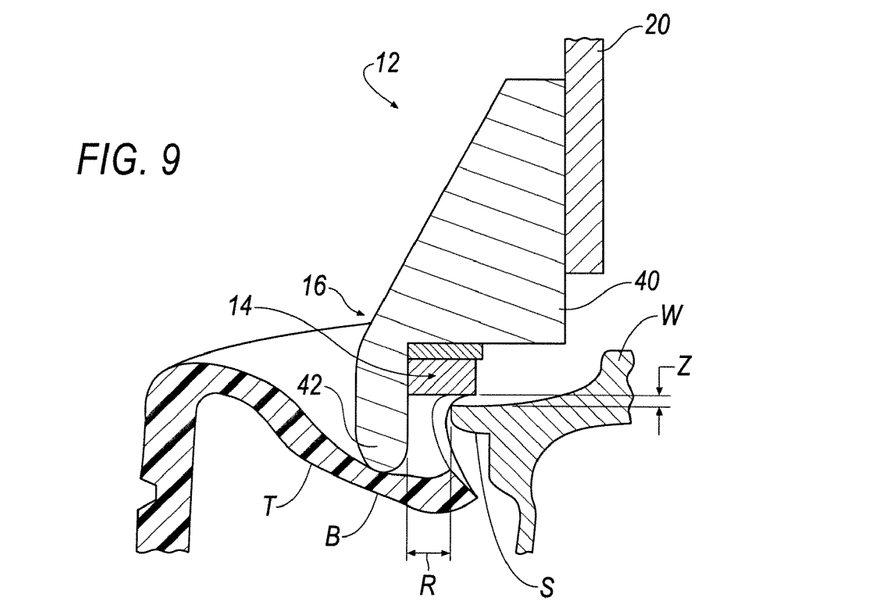
FIG. 9 is a cross-sectional view of the tire installation tool and tire and wheel assembly taken from the line 9-9 of FIG. 7.

According to an embodiment, FIGS. 3-6 depict tire installation tool 12 acting on tire T and wheel W in a first intermediate stage and FIGS. 7-9 depict tire installation tool 12 acting on tire T and wheel W in a second intermediate stage.

With reference to FIGS. 3-6, tire T has previously been arranged over wheel W in an unmounted state. It will be appreciated that tire T has two sides, each annular and defining an opening that extends through tire T. Each annulus includes a circumferential bead B that circumferentially surrounds the inner diameter of the annulus and defines the opening. It will also be appreciated that wheel W includes structure for accepting both beads B of tire T. In an embodiment, the wheel W defines two circumferential shoulders S for mountingly accepting each respective bead B to retain the tire T to the wheel W. S is commonly called the bead seating portion of wheel W. That is, the tire, via the beads B, is mounted to the wheel W using the inventive structure and process described herein.

It should be appreciated that while a particular wheel, tire and bead is shown in the drawings, the invention can be practiced across a variety of wheels, tires and beads and the invention should not be limited to the particular embodiments disclosed.

Preceding the steps shown in FIGS. 3-6, tire T is arranged over the wheel such that on one portion of the tire, both the upper bead B and the lower bead (not shown) are arranged axially below the upper shoulder S of the tire T. Likewise, on the remaining portion of the tire, the lower bead (not shown) is arranged axially below the upper shoulder S of the tire and the upper bead B is arranged axially above the upper shoulder S.

With reference now to FIGS. 3-6, in an embodiment, hub 22 and tire installation tool 12, including shoe and trailing guide 16, are axially lowered toward tire T and wheel W. In an embodiment, the tire installation tool 12 rotates about axis A while being lowered. In another embodiment, tire installation tool 12 does not rotate until becoming fully lowered. In an embodiment, tire installation tool 12 rotates about axis A in a clock-wise direction (when viewed from the hub looking down).

In either configuration described above, the initial rotation of installation tool 12 promotes an insertion of the leading end 34 of the beveled transition zone 38 axially underneath the upper bead B of tire T such that shoe 14 engages an inner axial face of bead B of tire T. Accordingly, once shoe 14 is appropriately inserted, bead B is arranged over at least a portion transition zone 38 of shoe 14. Moreover, trailing guide 16 contacts a bead portion B of tire T on an axial outer face of bead B. In an embodiment, once the foregoing insertion occurs, the transition zone 38 of shoe 14 (including the combination of leading end 34 and the outer radial side 28) urge the bead B over the shoulder S of wheel W without touching wheel W. In an embodiment and as depicted in the drawings, trailing guide 16 assists in the mounting by urging bead B axially downward likewise without touching wheel W.

More specifically and referring now to FIG. 6, an axial separation Z is provided between shoe 14 and the axial face of wheel W such that shoe 14 avoids contact with wheel W. With continued reference to FIG. 6, in an embodiment, a radial separation R is provided between an inner face of lobe 42 and an outer diameter of wheel W such that lobe 42 likewise avoids contact with wheel W. In an embodiment, therefore, neither shoe 14 nor trailing guide 16 contact wheel W as installation head rotates around wheel W.

Referring to FIG. 5, in the first intermediate stage, transition zone 26 contacts bead portion B for a distance D1.

As previously described, FIG. 7-9 depict tire installation tool 12 acting upon tire T and wheel W in a second intermediate stage where tire installation tool 12 has rotated clockwise such that a majority of bead B has been appropriately mounted to wheel W. As will be appreciated, as the tire T increasingly becomes appropriately mounted to the wheel W, the tire will tend to become increasingly taught around the shoe 14 and between shoe 14 and trailing guide 16. Accordingly, bead B will move higher along the leading edge 34 of transition zone 38 at an angle greater than the angle in the previous intermediate stage. This phenomenon can be seen by comparing D1 of FIG. 5 with D2 of FIG. 8. Accordingly, in the second intermediate stage, transition zone 30 contacts bead portion B for a distance D2 which is greater than distance D1. Support 18 may be sized and positioned such that it acts as a positive stop to limit the maximum radial travel allowed by bead portion B along edge 34. This process is continued until the bead portion B becomes fully mounted to the shoulder S. Upon approaching full rotation (not shown) the bead portion B will resultantly be completely drawn away from the transition zone 38 and into its proper position along shoulder S. Beveled transition zone 30 in combination with the decreasing available material which increases the angle of the material overlaying the transition zone provides the appropriate means that allow bead B to leave shoe 14 and become fully placed within shoulder S.

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims

What is claimed is:

1. A device for mounting a tire to a wheel, the tire and wheel, defining a central axis, the tire having an upper bead and a lower bead defining an opening extending through the tire for permitting insertion of the wheel therethrough, wherein the wheel includes an upper bead shoulder and a lower bead shoulder for correspondingly-receiving the upper bead and the lower bead of the tire to permit mounting of the tire to the wheel, said device comprising:

a controller;

an installation tool connected to the controller, wherein the controller provides means for rotating the installation tool about the central axis for causing the tire to be mounted to the wheel, wherein the installation tool includes a shoe having a leading end, an upper axial side, a lower axial side and an outer radial side, wherein the shoe includes a beveled transition zone that extends across at least a part of at least one of said upper axial side and said outer radial side, wherein the beveled transition zone, the leading end and the outer radial side provide means for urging the upper bead of the tire over the upper bead shoulder of the wheel without the shoe touching the wheel, wherein an initial rotation of the installation tool about the central axis by the means for rotating promotes the beveled transition zone to be located axially underneath the upper bead of the tire and whereupon the installation tool approaching a full rotation about the central axis by the means for rotating, the upper bead is resultantly completely drawn away from the beveled transition zone such that the upper bead is located along the upper bead shoulder of the wheel all while the shoe never comes into contact with the wheel as the installation tool is rotated about the central axis by the means for rotating.

2. The device according to claim 1, wherein said lower axial side of said shoe is axially separated from an axial upper side of the wheel by a non-zero distance.

3. The device according to claim 1 further comprising:

a trailing guide having a base and a lobe that extends axially downward beneath said base and said lower axial side of said shoe, wherein said trailing guide is positioned proximate said shoe and said lobe is offset from said shoe by a non-zero distance, and wherein said lobe provides means for exerting pressure upon an upper axial surface of the upper bead of the tire.

4. The device according to claim 3, wherein said trailing guide is positioned away from the wheel when pressure is exerted upon the upper axial surface of the upper bead of the tire such that said trailing guide does not contact the wheel.

5. The installation tool according to claim 1, further including a support that provides means for limiting maximum radial travel along the beveled transition zone allowed to the upper bead.

6. An installation tool for mounting a tire to a wheel, the tire and wheel defining a central axis, the tire having opposing annular sides having first and second openings therethrough, an upper circumferential bead having an inner radial surface that defines the first opening in an upper axial side of the tire and a lower circumferential bead that defines the second opening in a lower axial side of the tire, the upper circumferential bead having an upper axial surface and a lower axial surface, the wheel having a lower axial shoulder for receiving the lower circumferential bead and an upper axial shoulder for receiving the upper circumferential bead, said installation tool comprising:

a shoe having a leading end, an upper axial side, a lower axial side and an outer radial side, wherein said shoe includes a beveled transition zone that extends across at least a part of at least one of said upper axial surface and said outer radial surface, and wherein said shoe is axially movable about and selectively rotates around the central axis, and further wherein said beveled transition zone provides means for selectively engaging at least a portion of the lower axial surface of the upper circumferential bead for controllably mounting the bead of the tire to the shoulder of the wheel, wherein the beveled transition zone, the leading end and the outer radial side provide means for urging the upper circumferential bead of the tire over the upper axial shoulder of the wheel without the shoe touching the wheel, wherein an initial rotation of the installation tool about the central axis by a means for rotating promotes the beveled transition zone to be located axially underneath the upper circumferential bead of the tire and whereupon the installation tool approaching a full rotation about the central axis by the means for rotating, the upper circumferential bead is resultantly completely drawn away from the beveled transition zone such that the upper circumferential bead is located alone the upper axial shoulder of the wheel all while the shoe never comes into contact with the wheel as the installation tool is rotated about the central axis by the means for rotating.

7. The installation tool according to claim 6, wherein at least a portion of said shoe is radially positioned interior from an inner radial surface of the upper circumferential bead and at least a portion of said transition zone contacts a lower axial surface of the bead.

8. The installation tool according to claim 6 further comprising:

a trailing guide having a base and a lobe that extends axially downward beneath said base and said lower axial side of said shoe, and wherein said trailing guide is positioned proximate said shoe and said lobe is offset from said shoe by a non-zero distance, and further wherein said lobe includes a bead pressure surface that provides means for controllably exerting pressure upon an upper axial surface of the bead of the tire.

9. The installation tool according to claim 6, further comprising:

a controller connected to the installation tool, wherein the controller provides the means for rotating.

10. An installation tool for mounting a tire having a bead to a shoulder of a wheel, wherein the bead includes an upper axial surface, comprising:

a trailing guide having a lobe; and a shoe having a leading end, an outer radial side and a beveled transition zone including a bead transitioning surface, wherein said lobe provides means for
- exerting pressure upon the upper axial surface of the bead a the tire, wherein the beveled transition zone, the leading end and the outer radial side provide means for
- urging the bead of the tire over the shoulder of the wheel without the shoe touching the wheel, wherein an initial rotation of the installation tool about a central axis by a means for rotating promotes the beveled transition zone to be located axially underneath the bead of the tire and whereupon the installation tool approaching a full rotation about the central axis by the means for rotating, the bead is resultantly completely drawn away from the beveled transition zone such that the bead becomes subsequently positioned along the shoulder of the wheel all while the shoe never comes into contact with the wheel as the installation tool is rotated about the central axis by the means for rotating.

11. The installation tool according to claim 10, further comprising:
- a controller connected to the installation tool, wherein the controller provides the means for rotating, wherein the central axis extends through the tire and the wheel.

* * * * *

UNITED STATES PATENT AND TRADEMARK OFFICE
CERTIFICATE OF CORRECTION

| | | |
|---|---|---|
| PATENT NO. | : 7,712,510 B2 | Page 1 of 1 |
| APPLICATION NO. | : 11/855411 | |
| DATED | : May 11, 2010 | |
| INVENTOR(S) | : Patrick W. Zoller | |

It is certified that error appears in the above-identified patent and that said Letters Patent is hereby corrected as shown below:

Col 5, line 11, please change "wheel," to --wheel--.

Col 7, line 3, please change "a" to --of--.

Signed and Sealed this

Sixth Day of July, 2010

David J. Kappos
*Director of the United States Patent and Trademark Office*